United States Patent [19]

Gersho et al.

[11] 4,412,341

[45] Oct. 25, 1983

[54] INTERFERENCE CANCELLATION METHOD AND APPARATUS

[75] Inventors: Allen Gersho, Goleta, Calif.; Edmond Y. Ho, Colts Neck Township, Monmouth County, N.J.; Richard D. Gitlin, Monmouth Beach, N.J.; Victor B. Lawrence, Holmdel, N.J.; Tong L. Lim, Middletown, N.J.

[73] Assignee: Bell Telephone Laboratories, Incorporated, Murray Hill, N.J.

[21] Appl. No.: 322,517

[22] Filed: Nov. 18, 1981

[51] Int. Cl.³ .............................................. H04B 3/14
[52] U.S. Cl. .................................... 375/102; 375/118; 364/574
[58] Field of Search .................... 375/12, 14, 118, 94, 375/99, 102; 333/18; 328/155, 162; 364/574; 455/296

[56] References Cited

U.S. PATENT DOCUMENTS

| | | | |
|---|---|---|---|
| 3,648,171 | 3/1972 | Hirsch | 375/14 |
| 4,086,592 | 4/1978 | Lewis et al. | 375/99 |
| 4,217,584 | 8/1980 | Lombardi et al. | 364/574 |
| 4,253,184 | 2/1981 | Gitlin et al. | 375/14 |
| 4,288,872 | 9/1981 | Tamburelli | 375/14 |
| 4,320,526 | 3/1982 | Gitlin | 375/118 |

Primary Examiner—Benedict V. Safourek
Assistant Examiner—Stephen Chin
Attorney, Agent, or Firm—Ronald D. Slusky

[57] ABSTRACT

Weighted sums of samples of an interference-corrupted data signal are generated to form phase-compensated, symbol-spaced samples. The interference-corrupted signal is at the same time subjected to conventional adaptive equalization and is otherwise processed so as to form tentative decisions as to the transmitted data. Cancellation signals representing the interference components of the phase-compensated samples are generated by forming respective weighted sums of the tentative decisions and each cancellation signal is combined with a respective phase-compensated sample to provide cancelled samples from which final data decisions are made. The weighting coefficients used to form the phase-compensated samples and the cancellation signals are adaptively updated in response to error signals derived from the difference between each cancelled sample and the corresponding final decision.

47 Claims, 1 Drawing Figure

INTERFERENCE CANCELLATION METHOD AND APPARATUS

BACKGROUND OF THE INVENTION

The present invention relates to techniques for cancelling the interference from interference-corrupted data signals.

Data signals are subject to corruption by various types of interference. For example, phase and/or amplitude distortion in a transmission channel, such as a voiceband telephone channel, can result in intersymbol interference. The latter is conventionally dealt with in state-of-the-art receivers via adaptive feedforward equalization which uses weighted sums of, for example, passband samples of the received data signal to generate a stream of equalizer outputs which are substantially interference-free. The passband equalizer outputs are demodulated to form a stream of baseband outputs in response to which decisions are formed as to what the transmitted data was. An error signal formed in response to the difference between each baseband output and a corresponding decision is used to adaptively update the equalizer weighting coefficients in such a way as to minimize, for example, the average of the square of the error signal.

Adaptive equalizers—or structures that operate like adaptive equalizers—are also used to deal with interference which is not channel-distortion-induced. In adaptive antenna systems used in digital transmission, for example, the interference is in the form of so-called directional noise, or jamming signals. These signals, which impinge on the antenna from directions other than the direction of the desired signal, are effectively removed from the received, interference-corrupted signal by the adaptive equalization, or (more properly in this case) adaptive filtering, process. See, for example, B. Widrow et al., "Adaptive Antenna Systems," *Proc. of IEEE,* Vol. 55, No. 12, December 1967, pp. 2143–2159.

A disadvantageous property of equalizers of the above-described type—as well as so-called decision feedback equalizers which form weighted combinations of previous data decisions and feed them back to be combined with the received signal—is that at the same time that the distortion in the transmission channel is being compensated for, the noise in the channel, and in circuitry preceding the equalizer, is actually enhanced—at least in those applications in which the distortion is channel-induced. As a result of such noise enhancement, it may be impossible to achieve an acceptably low data error rate in such applications as the transmission of high speed data over channels which have both a high noise level and substantial amplitude (slope) and phase distortion. Transmission of 9600 bit/sec data over switched telephone network channels is a particular example.

One known approach for dealing with the noise-enhancement problem is taught, for example, in U.S. Pat. No. 3,648,171 issued Mar. 7, 1972 to D. Hirsch. There, samples of the received signal are subjected to conventional adaptive equalization and are otherwise processed so as to form decisions—referred to as "preliminary" decisions in Hirsch, but hereinafter referred to as "tentative" decisions—as to what the transmitted data was. The tentative decisions are applied to a processor—referred to in Hirsch as a "final equalizer" but hereinafter referred to as a "canceller"—which forms weighted sums of the tentative decisions. Each such weighted sum—hereinafter referred to as a "cancellation signal"—represents the interference component of a respective received signal sample and is combined therewith. This provides a stream of cancelled samples from which the final data decisions are made. The weighting coefficients used in the canceller are adaptively updated in response to an error signal derived from the difference between each final decision and the corresponding cancelled sample.

SUMMARY OF THE INVENTION

The present invention improves upon the technique disclosed in the Hirsch patent. In accordance with the invention, the cancellation signals are combined not with samples of the received signal per se but, rather, with phase-compensated samples thereof. By this is meant that if the frequency spectrum of the received signal samples is represented as $Y(\omega) = |Y(\omega)|e^{j\theta Y(\omega)}$, the frequency spectrum of the phase-compensated samples is a function of $|Y(\omega)|$ but is substantially independent of $\theta Y(\omega)$. In applications in which the interference is due to distortion in the channel, e.g., intersymbol interference, the phase-compensated samples represent samples of the received signal from which the component of the interference due to phase distortion in the channel has been substantially removed. Our invention has been found to provide improved error rates over the Hirsch technique when, for example, the data signals have been transmitted over a noisy channel having both high amplitude and phase distortion.

The phase-compensated samples of the received data signal may be generated by transversal filtering the received signal samples with a "matched filter" having a transfer function substantially equal to $|Y(\omega)|e^{-j\theta Y(\omega)}$, i.e., the complex conjugate of $Y(\omega)$. In this case, the frequency spectrum of the phase-compensated samples is substantially equal to $|Y(\omega)|^2$. The weighting coefficients used to achieve the matched filter characteristic are illustratively adapted in response to the same above-mentioned error signal employed to adapt the weighting coefficients used in the canceller.

Alternatively, the phase compensated samples can be generated via an all-phase compensator having a transfer function substantially equal to $e^{-\theta Y(\omega)}$. In this case, the frequency spectrum of the phase-compensated samples is substantially equal to $|Y(\omega)|$.

We have found that in voiceband data transmission systems in which the principal channel impairment is severe amplitude distortion, the present invention provides about a 2 dB improvement in output signal-to-noise ratio ($SNR_o$) over a conventional feedforward equalizer at a baud rate of 2400 and about 1 dB improvement in $SNR_o$ over combined feedforward and decision feedback equalization. The invention thus provides a one- to two-order-of-magnitude improvement in bit error rate over such prior art.

BRIEF DESCRIPTION OF THE DRAWING

The sole FIGURE in the drawing is a block diagram of a data signal receiver embodying the principles of the present invention.

DETAILED DESCRIPTION

Figure 1:
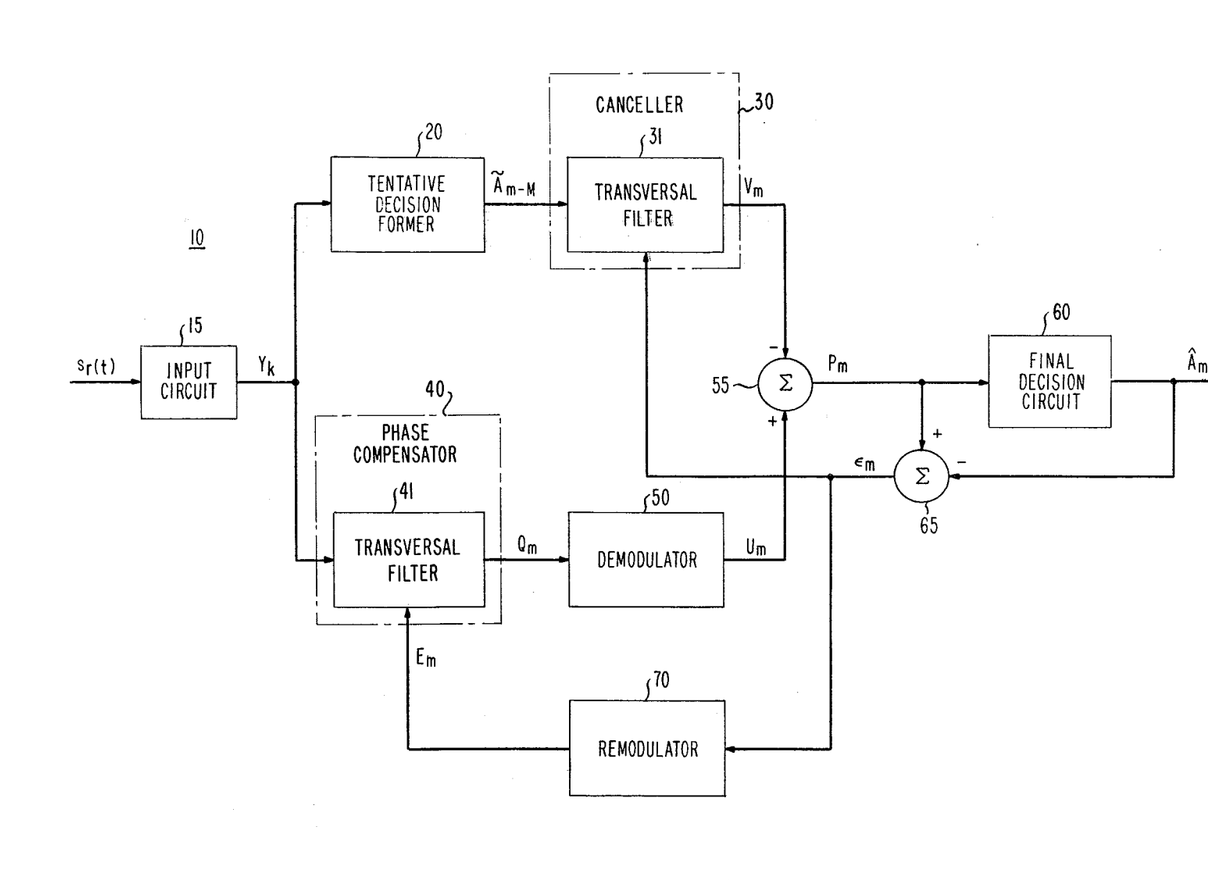

The FIGURE depicts a receiver 10 for double sideband-quadrature carrier (DSB-QC) data signals transmitted from a far-end transmitter (not shown) over a voiceband telephone channel. In the transmitter, a complex data signal value each of whose two, i.e., real and imaginary, components can take on one of a predetermined set of values, is generated during each of a succession of baud intervals of duration T. The two signal values, representing the real and imaginary components of each complex data signal value, amplitude modulate respective 1800 Hz in-phase and quadrature-phase carrier waves, which, in combination, comprise the DSB-QC signal transmitted to receiver 10.

The complex data signal values typically represent a stream of binary data to be transmitted. Illustratively, a two-dimensional scheme is employed in which each complex data signal value, on its own, represents p data bits. In such a scheme, each complex data signal value represents an independent data "symbol." Alternatively, an n-dimensional scheme, n>2, could be employed. For example, each of the complex data signal values transmitted in n/2 successive baud intervals could be used to represent np/2 data bits. In such a scheme, each data "symbol" is comprised of n/2 successive complex data signal values. See, for example, U.S. Pat. No. 4,084,137 issued Apr. 1, 1978 to G. R. Welti.

In receiver 10, the received DSB-QC signal $s_r(t)$ is applied to input circuit 15. As is conventional, the latter illustratively includes a series combination of an analog bandpass filter, which filters out energy in signal $s_r(t)$ outside the transmission band of interest; an automatic gain control circuit; an analog phase splitter; and an a/d converter. The latter samples the two outputs of the phase splitter to provide a sampled line signal comprised of complex passband line samples $Y_k$. Samples $Y_k$ are illustratively formed at twice the baud rate, i.e., at a rate of 2/T complex samples/sec, the index k thus advancing at that rate. The frequency spectrum of samples $Y_k$ is $Y(\omega) = |Y(\omega)| e^{j\theta Y(\omega)}$.

Line samples $Y_k$ are applied to phase compensator 40. The latter provides a phase-compensated passband signal comprised of complex passband samples $Q_m$. The frequency spectrum of samples $Q_m$ is $Q(\omega)$. The latter is a function of $|Y(\omega)|$ and is substantially independent of $\theta Y(\omega)$. In particular, phase compensator 40 is illustratively a "matched filter" having a transfer function substantially equal to $|Y(\omega)|e^{-j\theta Y(\omega)}$ so that $Q(\omega)$ is substantially equal to $|Y(\omega)|^2$. Alternatively, phase compensator 40 can be a so-called all-phase compensator having a transfer function substantially equal to $e^{-j\theta Y(\omega)}$ so that $Q(\omega)$ is substantially equal to $|Y(\omega)|$.

In either case, samples $Q_m$ represent samples of the received (bandpass filtered) signal with the intersymbol interference due to phase distortion in the transmission channel substantially removed. Samples $Q_m$ are provided at the baud rate 1/T, the index "m" thus advancing at that rate. Samples $Q_m$ are applied to demodulator 50 which generates a phase-compensated, or phase-distortion-removed, baseband signal comprised of complex phase-compensated, or phase-distortion-removed, baseband samples $U_m$. The latter, representing baseband weighted combinations of samples $Y_k$, are in turn, applied to the "+" input of a combiner 55. Samples $U_m$ are generated by the demodulator in accordance with $$U_m = Q_m e_m^{-j(\omega_o mT + \theta_m)}, \; m = 1, 2, 3, \ldots,$$

where $\omega_o$ is the carrier frequency and $\theta_m$ is an estimate of the current carrier phase. Although not explicitly shown in the FIGURE, delayed versions of the phase estimates used for demodulation in tentative decision former 20 (described below) can be used in demodulator 50 to form samples $U_m$ (and to form error signals $E_m$ in remodulator 70, as discussed below). (Those phase estimates should be made as accurate as possible. If, because of severe phase jitter or other channel impairments the phase estimates are inaccurate, the error performance of the system has been found to deteriorate substantially.)

Line samples $Y_k$ are also applied to tentative decision former 20. The latter provides a stream of tentative complex decisions $\tilde{A}_{m-M}$ as to what the transmitted complex data signal values were. (In the subscript "m−M," "m" is, again, the baud index and "M" is a constant equal to half the baud interval span of canceller 30, described below.)

Tentative decision former 20 may comprise any circuitry capable of forming decisions as to the values of the transmitted complex data signals. It may comprise, for example, circuitry which is conventionally used to form "final" decisions such as the adaptive transversal equalizer/demodulator/decision former circuitry shown in the copending U.S. patent application of B. E. McNair, Ser. No. 249,893, filed Apr. 1, 1981, and assigned to the present assignee; U.S. Pat. No. 4,245,345 issued Jan. 13, 1981 to R. D. Gitlin et al.; U.S. Pat. No. 4,247,940 issued Jan. 27, 1981 to K. H. Mueller et al.; and U.S. Pat. No. 4,237,554 issued Dec. 2, 1980 to R. D. Gitlin et al. Tentative decision former 20 could also include decision feedback equalization circuitry such as shown by D. A. George et al. in "An Adaptive Decision Feedback Equalizer," *IEEE Trans. on Comm. Tech.*, Vol. COM-19, No. 3, June 1971, pp. 281–293, and by D. D. Falconer in "Application of Passband Decision Feedback Equalization in Two-Dimensional Data Communication Systems," *IEEE Trans. on Communications*, Vol. COM-24, No. 10, October 1976, pp. 1159–1166. Tentative decision former 20 could also include the nonlinear feedforward and feedback equalization circuitry shown in U.S. Pat. Nos. 4,213,095 and 4,181,888 issued to D. D. Falconer on July 15, 1980 and Jan. 1, 1980, respectively. The above documents are hereby incorporated by reference.

Tentative decisions $\tilde{A}_{m-M}$ are applied to canceller 30, described in detail below. For the present it suffices to say that canceller 30 operates in response to the tentative decisions to generate a cancellation signal comprised of complex signals $V_m$ each of which is an estimate of the intersymbol interference component of a corresponding one of samples $U_m$. Since samples $U_m$ are phase-compensated, the intersymbol interference components thereof are principally the result of amplitude distortion in the channel. Signals $V_m$ are applied to the "−" input of combiner 55, where each of them is combined with the corresponding one of samples $U_m$ to provide a cancelled signal comprised of cancelled baseband samples $P_m$. (In order to ensure that $V_m$ and $U_m$ are applied to combiner 55 substantially concurrently, phase compensator 40 may include a bulk delay unit for delaying samples $Y_k$ by an appropriate amount.)

Samples $P_m$ are applied to final decision circuit 60 which quantizes them to form a stream of complex final decisions $\tilde{A}_m$ as to what the transmitted data signal values were. ("Final" decisions $\tilde{A}_m$ could, if desired, serve as tentative decisions for yet further signal processing circuitry.)

As previously noted, phase compensator 40 is illustratively a matched filter having a transfer function substantially equal to $|Y(\omega)|e^{-j\theta Y(\omega)}$. It is illustratively realized as a transversal filter 41 which generates each of the samples $Q_m$ by forming a complex linear combination of the 2L most recent samples $Y_k$ in accordance with the relation $$Q_m = \sum_{k=-L}^{(L-1)} W_k(m) Y_{2m-k}, \quad m = 1, 2, 3, \ldots,$$

where the $W_k(m)$'s are an ensemble of 2L complex weighting coefficients whose values are adaptively updated for each baud interval, as described below, and are thus a function of m. (As an alternative, phase compensator 40 could be arranged to operate on baud-spaced line samples rather than fractionally-spaced line samples. The latter is advantageous, however, because, unlike the former, it does not require precise control of the sampler timing phase.)

The parameter L in the above relation is selected such that phase compensator 40 spans the channel impulse response, i.e., the time span between the generation of sample $Y_{2m-(L-1)}$ and sample $Y_{2m+L}$ is at least as long as the channel impulse response, which, in this case, is illustratively 31 baud intervals. Since samples $Y_k$ occur at twice the baud rate, the number of samples used to generate each $Q_m$ must be at least twice that number. Therefore L=31. Advantageously, L may be chosen to be greater than the baud interval span of the channel by an amount which ensures that each $U_m$ is generated at substantially the same time as the corresponding $V_m$.

Canceller 30 is also illustratively a transversal filter, 31, which generates signals $V_m$ by forming a complex linear combination of the tentative decisions. In generating a particular final decision, $\tilde{A}_m$, the corresponding tentative decision, $\tilde{A}_m$, is not used in generating the intersymbol interference estimate $V_m$. In particular, canceller 30 illustratively generates each of the signals $V_m$ by forming a complex linear combination of the (2M−1) most recent tentative decisions (excluding $A_m$) in accordance with the relation $$V_m = \sum_{\substack{k=-M \\ \neq 0}}^{M} C_k(m) \tilde{A}_{m-k},$$

where the $C_k(m)$'s are an ensemble of (2M−1) complex adaptively updated weighting coefficients and, again, M is selected such that canceller 30 spans the channel impulse response. Since tentative decisions $\tilde{A}_m$ occur at the baud rate, the number of tentative decisions used to generate each $V_m$ must be at least equal to the length, in baud intervals, of the impulse response. Therefore M=16.

Illustratively, the weighting coefficients used in canceller 30, as well as those used in phase compensator 40, are adaptively updated in response to the same error signals, $\epsilon_m = \pm(P_m - \tilde{A}_m)$. In the present illustrative embodiment, in particular, $\epsilon_m = +(P_m - \tilde{A}_m)$. The error signals $\epsilon_m$ are formed by combiner 65 which subtracts each of the final decisions $\tilde{A}_m$ from the corresponding cancelled sample $P_m$. Updating of the $C_k(m)$'s used in canceller 30 is illustratively carried out within the canceller using a stochastic gradient criterion realized by updating relation $$C_k(m+1) = C_k(m) + \alpha\epsilon_m \tilde{A}^*_{m-k} - \delta_1, \quad k = -M, \ldots M \\ \neq 0$$

where the asterisk denotes complex conjugate, $\alpha$ is a selected step size whose sign is determined by the selected polarity (±) of error signals $\epsilon_m$ (in the present embodiment, $\alpha$ is a positive number), and $\delta_1$ is a so-called "leakage" term. The function of the leakage term is to prevent the $C_k(m)$'s from drifting to overly-large values and it may take any of several forms. One possibility is $$\delta_1 = \mu SGN[C_k(m) - \alpha\epsilon_m \tilde{A}^*_{m-k}]$$

where $\mu$ is a constant and SGN is the complex signum function whose value is $\pm 1 \pm j$, depending on the signs of the real and imaginary components of its arguments. This form of leakage makes it particularly easy to carry out the updating relation in embodiments in which the $C_k(m)$'s are stored in two's complement form. In particular, first the term $\alpha\epsilon_m \tilde{A}^*_{m-k}$ is combined with $C_k(m)$ to form a partially updated coefficient. The leakage portion of the updating relation is then realized by combining the sign bit for each component of the partially updated coefficient with a particular bit position in that component. The bit position is determined by the desired value of $\mu$ which, in turn, can be determined experimentally. If the coefficient drifting phenomenon does not manifest itself in a particular embodiment, $\delta_1$ can be zero.

(An analysis of the operation of canceller 30 shows that, at least theoretically, $C_k(m) = C_{-k}^*(m)$, i.e., the $(-k)^{th}$ coefficient is equal to the complex conjugate of the $k^{th}$ coefficient. Thus, only half the coefficient values would need to be stored and updated, with the other half being readily determined from the first. Experimentally, it has been observed that the relationship $C_k(m) = C_{-k}^*(m)$ des not hold precisely, but that it is close enough that the expedient of storing and updating only half the $C_k(m)$'s can be employed without causing any noticeable degradation in canceller performance.)

Since phase compensator 40 operates on passband samples, its weighting coefficients must be updated in response to passband error signals. To this end, error signals $\epsilon_m$ are applied to a remodulator 70 which generates a passband error signals $E_m$ in accordance with $$E_m = \epsilon_m e^{j(\omega_o mT + \theta_m)} = \pm(P_m - \tilde{A}_m)e^{j(\omega_o mT + \theta_m)}$$

(In the present illustrative embodiment, $E_m = +(P_m - \tilde{A}_m)e^{j(\omega_o mT + \theta_m)}$.) The updating relation for the $W_k(m)$'s again follows a stochastic gradient criterion and, more particularly, is the relation $$W_k(m+1) = W_k(m) - \beta E_m Y^*_{2m-k} - \delta_2, \quad k = -L, \ldots, (L-1),$$

where $\beta$ is a second selected step size which could be equal to $\alpha$ and $\delta_2$ is another tap leakage term. The form of $\delta_2$, as well as the manner in which this updating relation is carried out can be analogous to what is described above in connection with updating of the canceller coefficients.

The step sizes $\alpha$ and $\beta$ used in the above updating relations must satisfy the constraint that their magnitudes are less than the quantity $$\frac{1}{(2L + 2M)<x^2>},$$

where $<x^2>$ is the average input signal power. In practice, they should be chosen sufficiently large to obtain reasonably fast convergence of the coefficient values, but not so large as to result in unstable operation. Indeed, two or more values of each of the step sizes can be used. For example, in an embodiment in which data signal component values of $\pm 1$, $\pm 3$ are used, $\alpha = \beta = 0.0005$ can be used to achieve initial convergence using ideal reference data, with a switch thereafter being made to $\alpha = \beta = 0.00005$.

Receiver 10 can be started up in any desired way. It has, for example, been found satisfactory to set all coefficients to zero, allow the coefficients used in the equalizer within tentative decision former 20 to adapt in response to ideal reference data (i.e., data which is known a priori at the receiver) to a point where reasonably good tentative decisions are provided, and then allow the coefficients used in the phase compensator and canceller to jointly adapt in response to the ideal reference data.

The receiver can also be started up in a decision-directed mode. In this case, however, error signals $\epsilon_m$ should be generated not in response to final decisions $\tilde{A}_m$ during start-up but, rather, in response to tentative decisions $\tilde{A}_m$. Otherwise, the receiver may start up in a degenerate mode in which $U_m = 0$, $V_m = P_m = \tilde{A}_m$ and $\epsilon_m = 0$, for all m.

Indeed, it is possible that even if the receiver is started up properly, the above-described updating in response to $\epsilon_m = \pm(P_m - \tilde{A}_m)$ may cause the values of the $C_k(m)$'s and $W_k(m)$'s to drift over time such that the receiver falls into the degenerate mode just mentioned. This problem can be dealt with by updating in response to an error signal equal to $\pm(P_m - \tilde{A}_m)$, i.e., an error signal generated in response to the tentative, rather than final, decisions. To this end, receiver 10 could be modified by, for example, providing an M-baud delay unit whose input is taken from the output of tentative decision former 20 and whose output is applied to the "−" (subtractive) input of combiner 65 in place of the output of final decision circuit 60.

It has been observed experimentally that even when a leakage term is included in the updating relation for the $C_k(m)$'s, their values may still become unduly large—particularly when there is significant second-order harmonic distortion in the channel. Out preferred way of dealing with this problem, which can be used in combination with, or instead of, leakage, is to set an upper limit on the coefficient magnitudes and to not let any coefficient magnitude exceed that limit. An appropriate value for such a "saturation" limit can be determined straightforwardly from the anticipated worst-case normalized channel-distortion impulse response. In an experimental embodiment in which the peak pulse sample value was unity, a saturation level of approximately $\frac{3}{2}$ was used. Another alternative is to round down the coefficient magnitudes on a time-random basis.

Numerous types of circuit structures can be used to realize the adaptive transversal filters which illustratively comprise canceller 30 and phase compensator 40. Each filter might comprise, for example, a programmed general-purpose processor (microprocessor), or special-purpose LSI circuitry operating under the control of micro-coded instructions. An example of the latter, is the so-called equalizer section disclosed in the copending U.S. patent application of G. J. Kustka, Ser. No. 195,367, filed Oct. 9, 1980 and the U.S. patent application of G. J. Kustka et al, Ser. No. 196,158, filed Oct. 10, 1980, both assigned to the present assignee and both hereby incorporated by reference. Such equalizer sections could be used not only to implement canceller 30 and/or phase compensator 40, but the equalizer within tentative decision former 20. Indeed, the functions of any portion or all of the entire receiver can be realized by, for example, one or more programmed general purpose processors, microcoded circuits, discrete components or combinations of these. Thus although the components of receiver 10 are depicted for convenience as individual, self-contained units, each component could in fact be comprised of (a) circuitry shaped in whole or in part with the other components (b) combined with stored program instructions which cause that circuitry to be operated so as to provide the function of the component in question.

Although a specific embodiment of the invention is shown and described herein, such as merely illustrative of the principles of the invention. For example, the weighting coefficients used in the phase compensator and canceller can be updated using updating relations other than those disclosed herein. It is tacitly assumed hereinabove that $V_m$, $Q_m$, $U_m$, $P_m$, $\tilde{A}_m$, $\epsilon_m$ and $E_m$ are generated within the same baud interval of duration T. In practical implementations, however, it may not be possible or desirable to do this. In such implementations, the updating relations for the canceller and phase compensator weighting coefficients would have to be modified to take account of the fact that one or both of error signals $\epsilon_m$ and $E_m$ may not be available in time to update the $C_k(m)$'s and $W_k(m)$'s. In particular, the following updating relations may be used:

$$C_k(m + 1) = C_k(m) + \alpha\epsilon_{m-d_1}\tilde{A}^*_{m-k-d_1} - \delta_1, \; k = -M, \ldots M$$
$$\neq 0$$

$$W_k(m + 1) = W_k(m) - \beta E_{m-d_2}Y^*_{2m-k-d_2} - \delta_2,$$
$$k = -L, \ldots (L - 1)$$

where $d_1$ ($d_2$) is at least equal to the number of baud intervals of delay between the generation of $V_m$ ($Q_m$) and error signals ($\epsilon_m$) $E_m$. In general, $d_1$ and $d_2$ can take on any integer values including zero, the latter case corresponding, of course, to the updating relations first presented hereinabove.

Another possible approach, useable in systems employing four-dimensional modulation, is to update in accordance with $$C_k(m + 1) = C_k(m) + \alpha\epsilon_{m-d_1-1}\tilde{A}^*_{m-k-d_1-1} - \delta_1$$

$$C_k(m + 2) = C_k(m + 1) + \alpha[\gamma\epsilon_{m+1-d_1}\tilde{A}^*_{m-k-d_1-1} +$$
$$\overline{\gamma}\epsilon_{m-d_1}\tilde{A}^*_{m-k-d_1}] - \delta_1$$
$$k = -M, \ldots M$$
$$\neq 0$$

and $$W_k(m + 1) = W_k(m) - \beta E_{m-d_2-1}Y^*_{2m-k-d_2-1} - \delta_2$$

$$W_k(m + 2) = W_k(m + 1) - \beta[\gamma E_{m+1}Y^*_{2m-k-d_2-1} +$$
$$\overline{\gamma}E_{m-d_1}Y^*_{2m-k-d_2}] - \delta_2$$

-continued $$k = -L, \ldots (L-1)$$

for m even, $d_1$ even, $d_2$ even. Appropriate values for the parameters $\gamma$ and $\overline{\gamma}$ as well as for $\alpha$ and $\beta$ can be determined experimentally under the above-stated constraints for $\alpha$ and $\beta$ and under the further constraints that $0 < \overline{\gamma} < \gamma$ and $\gamma + \overline{\gamma} = 1$.

Moreover, as previously noted, phase compensator 40 could be a so-called all-phase compensator having a transfer function substantially equal to $e^{-j\theta Y(\omega)}$. Such an all phase compensator could be realized by, for example, a fast Fourier transform circuit which would generate (a) a complex frequency-domain line spectrum of the samples $Y_k$ and (b) generate as the phase compensator output baud-spaced time-domain samples derived from the amplitude component of that line spectrum.

Another variation might be to feed phase compensator 40 with equalized samples from within tentative decision former 20 rather than with line samples. This, however, might make the system less stable. In addition, final decisions $\tilde{A}_{m-(M+1)} \ldots \tilde{A}_m$ could be fed back for use in canceller 30 in place of tentative decisions $\tilde{A}_{m-(M+1)} \ldots \tilde{A}_m$. Since the final decisions should contain fewer errors than the tentative decisions, this may result in a somewhat more accurate $V_m$ and, thus, a somewhat lower final decision error rate. Moreover, if desired, demodulator 50 could precede phase compensator 40, in which case, of course, the phase compensator would form weighted combinations of the demodulator's output samples rather than weighted combinations of samples $Y_k$. And, of course, the updating relations for the $W_k(m)$'s would include baseband error signals $\epsilon_m$ rather than passband error signals $E_m$. With such modification, the frequency spectrum of the phase compensator input samples could, as a matter of notation, still be denominated $Y(\omega)$ as long as $Y(\omega)$ is understood to be a baseband spectrum. Similarly, the transfer function of phase compensator 40 could still be represented as $|Y(\omega)|e^{-j\theta Y(\omega)}$ (or $e^{-j\theta Y(\omega)}$) and the spectrum of its output samples as $|Y(\omega)|^2$ (or $|Y(\omega)|$).

The invention is applicable not only to passband systems, but also to baseband systems and not only to systems using n-dimensional (n≦2) modulation, but to systems using one-dimensional modulation, e.g., amplitude modulation.

In addition, it should be emphasized the invention is applicable not only to transmission over voiceband telephone channels, but other types of channels, such as microwave radio channels and is effective in dealing not only with intersymbol interference but other forms of interference such as discussed hereinabove in connection with adaptive antenna systems. The invention is thus applicable to such systems as the recording readback arrangement shown by O. R. Luhrs et al. in *IBM Tech. Discl. Bull.*, Vol. 20, No. 2, July 1977, pp. 523 et seq.

It is thus anticipated that those skilled in the art will be able to devise numerous arrangements which, although not explicitly shown or described herein, take advantage of the teachings of the invention and which thus do not depart from their spirit and scope.

What is claimed is:

1. Apparatus for processing an interference-corrupted signal representing a plurality of data signal values, said interference-corrupted signal having a frequency spectrum $Y(\omega) = |Y(\omega)|e^{j\theta Y(\omega)}$, said apparatus comprising means for generating in response to said interference-corrupted signal a phase-compensated signal whose frequency spectrum is a function of $|Y(\omega)|$ and is substantially independent of $\theta Y(\omega)$, canceller means for forming in response to a stream of tentative decisions as to said signal values a cancellation signal representing the interference in said phase-compensated signal, said tentative decisions having been formed in response to said interference-corrupted signal, and means for forming a stream of final decisions as to said signal values in response to said phase-compensated and cancellation signals.

2. The invention of claim 1 wherein said generating means comprises means having a transfer function substantially equal to $|Y(\omega)|e^{-j\theta Y(\omega)}$.

3. The invention of claim 2 wherein said generating means includes a transversal filter whose weighting coefficients are adaptively updated.

4. The invention of claim 3 wherein said final decision forming means forms said final decisions in response to a cancelled signal which is a function of said phase-compensated and cancellation signals and wherein said generating means is adapted to update said coefficients in response to an error signal which is a function of said cancelled signal and a selected one of said decision streams.

5. The invention of claim 4 wherein said canceller means includes a transversal filter whose weighting coefficients are adaptively updated in response to said error signal.

6. The invention of claim 5 wherein the weighting coefficients of at least one of said transversal filters are updated in accordance with a stochastic gradient criterion.

7. The invention of claim 1 wherein said generating means comprises means having a transfer function substantially equal to $e^{-j\theta Y(\omega)}$.

8. The invention of claim 1, 2, 3 or 7 wherein said canceller means includes a transversal filter whose weighting coefficients are adaptively updated.

9. The invention of claim 1, 2 or 7 wherein at least one of said generating and canceller means includes a transversal filter and wherein the weighting coefficients of at least one of said transversal filters are updated substantially in accordance with a stochastic gradient criterion.

10. Apparatus for processing an interference-corrupted signal representing a plurality of data signal values, said apparatus comprising means for generating baseband phase-compensated samples each of which is equal to a baseband weighted combination of samples derived from said interference-corrupted signal, means for forming in response to said interference-corrupted signal a plurality of tentative decisions as to said data signal values, canceller means for forming cancellation signals each of which is equal to a weighted combination of said tentative decisions, and means for forming a plurality of final decisions as to said data signal values in response to said baseband phase-compensated samples and said cancellation signals.

11. The invention of claim 10 wherein said final decision forming means forms each of said final decisions in response to at least one of a plurality of cancelled samples, each cancelled sample being a function of the difference between one of said baseband phase-compensated samples and a respective one of said cancellation signals and wherein in said generating means and in said canceller means the weighting coefficients used to form said weighted combinations are updated in response to error signals derived from said cancelled samples and a predetermined one of said decision pluralities.

12. The invention of claim 11 wherein the frequency spectrum of said interference-corrupted signal is $Y(\omega) = |Y(\omega)| e^{j\theta Y(\omega)}$ and wherein the weighting coefficients in said generating means are updated in such a way that the frequency spectrum of said baseband phase-compensated samples is a function of $|Y(\omega)|$ and is substantially independent of $\theta_Y(\omega)$.

13. The invention of claim 11 wherein the frequency spectrum of said interference-corrupted signal is $Y(\omega) = |Y(\omega)| e^{j\theta Y(\omega)}$ and wherein the weighting coefficients in said generating means are updated in such a way that the frequency spectrum of said baseband phase-compensated samples is substantially equal to $|Y(\omega)|^2$.

14. The invention of claim 13 wherein each of said error signals is substantially equal to the difference between an individual one of said cancelled samples and a respective one of the decisions of said predetermined plurality and wherein the weighting coefficients used in said generating means are updated in response to said error signals in accordance with a stochastic gradient criterion.

15. The invention of claim 14 wherein the weighting coefficients in said canceller means are updated in response to said error signals in accordance with a stochastic gradient criterion.

16. Apparatus for processing a signal received from a transmission channel, said signal representing a plurality of data signal values, and said signal including interference resulting from phase and amplitude distortion in said channel, said apparatus comprising
means for generating samples of said received signal from which the interference due to said phase distortion has been substantially removed,
canceller means for forming in response to tentative decisions as to said data signal values cancellation signals each of which is substantially equal to the interference in a respective one of said phase-distortion-removed samples, and
means for forming final decisions as to said data signal values in response to said phase-distortion-removed samples and said cancellation signals.

17. The invention of claim 16 wherein said final decision forming means forms each of said final decisions in response to at least one of a plurality of cancelled samples, each cancelled sample being a function of the difference between one of said phase-distortion-removed samples and a respective one of said cancellation signals and wherein said generating means comprises a transversal filter whose weighting coefficients are updated in response to error signals derived from said cancelled samples and selected ones of said tentative and final decisions.

18. The invention of claim 17 wherein the frequency spectrum of said received signal is $Y(\omega) = |Y(\omega)| e^{j\theta Y(\omega)}$ and wherein the weighting coefficients in said generating means are updated in such a way that the frequency spectrum of said phase-distortion-removed samples is a function of $|Y(\omega)|$ and is substantially independent of $\theta_Y(\omega)$.

19. The invention of claim 17 wherein the frequency spectrum of said received signal is $Y(\omega) = |Y(\omega)| e^{j\theta Y(\omega)}$ and wherein the weighting coefficients in said generating means are updated in such a way that the frequency spectrum of said phase-distortion-removed samples is substantially equal to $|Y(\omega)|^2$.

20. The invention of claim 19 wherein each of said error signals is substantially equal to the difference between an individual one of said cancelled samples and a respective one of said selected ones of said decisions and wherein the weighting coefficients used in said generating means are updated in response to said error signals in accordance with a stochastic gradient criterion.

21. The invention of claim 20 wherein said canceller means comprises a transversal filter and wherein the weighting coefficients used in said canceller means are updated in response to said error signals in accordance with a stochastic gradient criterion.

22. Apparatus for processing an interference-corrupted passband signal representing a plurality of complex signal values transmitted at a T-second baud rate and with a carrier frequency $\omega_o$, said apparatus comprising
means for forming in response to said interference-corrupted signal complex tentative decisions $\tilde{A}_{m-M}$ as to said signal values, m being an index which advances at the baud rate and M being a selected integer,
cancelled sample forming means for forming complex cancelled samples $P_m$ substantially given by $P_m = (U_m - V_m)$, where $$U_m = \sum_{k=-L}^{(L-1)} W_k(m) Y_{2m-k} e^{-j(\omega_o mT + \theta_m)},$$

$$V_m = \sum_{\substack{k=-M \\ \neq 0}}^{M} C_k(m) \tilde{A}_{m-k}$$

the $W_k(m)$'s are a first ensemble of complex weighting coefficients, the $Y_{2m-k}$'s are samples derived from said received signal, L is a selected integer, $\theta_m$ is a carrier phase estimate, and the $C_k(m)$'s are a second ensemble of complex weighting coefficients, and
means for forming final decisions $\bar{A}_m$ as to said signal values in response to said cancelled samples.

23. The invention of claim 22 wherein said cancelled sample forming means generates the values of the $W_k(m)$'s in response to error signals which are functions of said cancelled samples and selected ones of said tentative and final decisions.

24. The invention of claim 23 wherein said error signals are complex error signals $E_m$ and wherein said cancelled sample forming means generates the values of the $W_k(m)$'s in accordance with $$W_k(m+1) = W_k(m) - \beta E_{m-d_2} Y^*_{2m-k-d_2} - \delta_2, \quad k = -L, \ldots (L-1)$$

where $\beta$ is a selected step size, $d_2$ is a selected integer, including zero, $\delta_2$ is a selected leakage term, and the asterisk denotes complex conjugate.

25. The invention of claim 24 wherein said error signals $E_m$ are substantially equal to $$E_m = \pm (P_m - \bar{A}_m) e^{j(\omega_o mT + \theta_m)}.$$

26. The invention of claim 22, 23, 24 or 25 wherein said cancelled sample forming means generates the values of the $C_k(m)$'s in response to error signals which are functions of said cancelled samples and selected ones of said tentative and final decisions.

27. The invention of claim 24 or 25 wherein said cancelled samples forming means generates the values of the $C_k(m)$'s in accordance with $$C_k(m+1) = C_k(m) + \alpha\epsilon_{m-d_1}\tilde{A}^*_{m-k-d_1} - \delta_1, \quad k = -M, \ldots M \ne 0$$

where $\alpha$ is a selected step size, $\delta_1$ is a selected leakage term, the $\epsilon_m$'s are complex error signals and $d_1$ is a selected integer including zero.

28. The invention of claim 27 wherein said error signals $\epsilon_m$ are substantially equal to $$\epsilon_m = \pm(P_m - \tilde{A}_m).$$

29. A method for processing an interference-corrupted signal representing a plurality of data signal values, said interference-corrupted signal having a frequency spectrum $Y(\omega) = |Y(\omega)|e^{j\theta Y(\omega)}$, said method comprising the steps of
generating in response to said interference-corrupted signal a phase-compensated signal whose frequency spectrum is a function of $|Y(\omega)|$ and is substantially independent of $\theta Y(\omega)$,
forming in response to a plurality of tentative decisions as to said signal values a cancellation signal representing the interference in said phase-compensated signal, said tentative decisions having been formed in response to said interference-corrupted signal, and
forming a plurality of final decisions as to said signal values in response to said phase-compensated and cancellation signals.

30. The invention of claim 29 wherein said generating step comprises the step of transversal filtering said interference-corrupted signal with a transfer function substantially equal to $|Y(\omega)|e^{-j\theta Y(\omega)}$.

31. The invention of claim 30 wherein in said final decision forming step said final decisions are formed in response to a cancelled signal which is a function of said phase-compensated and cancellation signals and wherein the weighting coefficients used in said transversal filtering step are updated in response to an error signal which is a function of said cancelled signal and a selected one of said tentative and final decisions.

32. The invention of claim 32 wherein said weighting coefficients are updated in accordance with a stochastic gradient criterion.

33. A method for processing an interference-corrupted signal representing a plurality of data signal values, said method comprising the steps of
generating baseband phase-compensated samples each of which is equal to a baseband weighted combination of samples derived from said interference-corrupted signal,
forming in response to said interference-corrupted signal tentative decisions as to said data signal values,
forming cancellation signals each of which is equal to a weighted combination of said tentative decisions, and forming final decisions as to said data signal values in response to said baseband phase-compensated samples and said cancellation signals.

34. The invention of claim 33 wherein the frequency spectrum of said interference-corrupted signal is $Y(\omega) = |Y(\omega)|e^{j\theta Y(\omega)}$ and wherein said baseband phase-compensated samples are generated in such a way that their frequency spectrum is a function of $|Y(\omega)|$ and is independent of $\theta Y(\omega)$.

35. The invention of claim 33 wherein the frequency spectrum of said interference-corrupted signal is $Y(\omega) = |Y(\omega)|e^{j\theta Y(\omega)}$ and wherein said baseband phase-compensated samples are generated in such a way that their frequency spectrum is substantially equal to $|Y(\omega)|^2$.

36. A method for processing a signal received from a transmission channel, said signal representing a plurality of data signal values, and said signal including interference resulting from phase and amplitude distortion in said channel, said method comprising the steps of
generating samples of said received signal from which the interference due to said phase distortion has been substantially removed,
forming in response to tentative decisions as to said data signal values cancellation signals each of which is substantially equal to the interference in a respective one of said phase-distortion-removed samples, and
forming final decisions as to said data signal values in response to said phase-distortion-removed samples and said cancellation signals.

37. The invention of claim 36 wherein in said final decision forming step each of said final decisions is formed in response to at least one of a plurality of cancelled samples, each cancelled sample being a function of the difference between one of said phase-distortion-removed samples and a respective one of said cancellation signals and wherein said generating step comprises the steps of transversal filtering said received signal and updating the weighting coefficients used in said transversal filtering step in response to error signals derived from said cancelled samples and selected ones of said tentative and final decisions.

38. The invention of claim 37 wherein the frequency spectrum of said received signal is $Y(\omega) = |Y(\omega)|e^{j\theta Y(\omega)}$ and wherein said weighting coefficients are updated in such a way that the frequency spectrum of said phase-distortion-removed samples is a function of $|Y(\omega)|$ and is substantially independent of $\theta Y(\omega)$.

39. The invention of claim 37 wherein the frequency spectrum of said signal is $Y(\omega) = |Y(\omega)|e^{j\theta Y(\omega)}$ and wherein said weighting coefficients are updated in such a way that the frequency spectrum of said phase-distortion-removed samples is substantially equal to $|Y(\omega)|^2$.

40. The invention of claim 39 wherein each of said error signals is substantially equal to the difference between an individual one of said cancelled samples and a respective one of said ones of said decisions and wherein said weighting coefficients are updated in response to said error signals in accordance with a stochastic gradient criterion.

41. A method for processing an interference-corrupted passband signal representing a plurality of complex signal values transmitted at a T-second baud rate and with a carrier frequency $\omega_o$, said method comprising the steps of
forming in response to said interference-corrupted signal complex tentative decisions $\tilde{A}_{m-M}$ as to said signal values, m being an index which advances at the baud rate and M being a selected integer, forming complex cancelled samples $P_m$ substantially given by $P_m = (U_m - V_m)$, where $$U_m = \sum_{k=-L}^{(L-1)} W_k(m) Y_{2m-k} e^{-j(\omega_o mT + \theta_m)},$$

$$V_m = \sum_{\substack{k=-M \\ \neq 0}}^{M} C_k(m) \tilde{A}_{m-k},$$

the $W_k(m)$'s are a first ensemble of complex weighting coefficients, the $Y_{2m-k}$'s are samples derived from said received signal, L is a selected integer, $\theta_m$ is a carrier phase estimate, and the $C_k(m)$'s are a second ensemble of complex weighting coefficients, and forming final decisions $\tilde{A}_m$ as to said signal values in response to said cancelled samples.

42. The invention of claim 41 wherein the values of the $W_k(m)$'s are generated in response to error signals which are functions of said cancelled samples and selected ones of said tentative and final decisions.

43. The invention of claim 42 wherein said error signals are complex error signals $E_m$ and wherein the values of the $W_k(m)$'s are generated in accordance with $$W_k(m+1) = W_k(m) - \beta E_{m-d_2} Y^*_{2m-k-d_2} - \delta_2, \quad k = -L, \ldots (L-1)$$

where $\beta$ is a selected step size, $d_2$ is a selected integer, including zero, $\delta_2$ is a selected leakage term, and the asterisk denotes complex conjugate.

44. The invention of claim 43 wherein said error signals $E_m$ are substantially equal to $$E_m = \pm (P_m - \tilde{A}_m) e^{j(\omega_o mT + \theta_m)}.$$

45. The invention of claim 41, 42, 43 or 44 wherein the values of the $C_k(m)$'s are generated in response to error signals which are functions of said cancelled samples and selected ones of said tentative and final decisions.

46. The invention of claim 43 or 44 wherein the values of the $C_k(m)$'s are generated in accordance with $$C_k(m+1) = C_k(m) + \alpha \epsilon_{m-d_1} \tilde{A}^*_{m-k-d_1} - \delta_1, \quad k = -M, \ldots M \neq 0$$

where $\alpha$ is a selected step size, $\delta_1$ is a selected leakage term, the $\epsilon_m$'s are the complex error signals and $d_1$ is a selected integer including zero.

47. The invention of claim 46 wherein said error signals $\epsilon_m$ are substantially equal to $\epsilon_m = \pm(P_m - A_m)$.

* * * * *

UNITED STATES PATENT AND TRADEMARK OFFICE
CERTIFICATE OF CORRECTION

PATENT NO. : 4,412,341            Page 1 of 4

DATED : October 25, 1983

INVENTOR(S) : Allen Gersho, Edmond Y. Ho, Richard D. Gitlin, Victor B. Lawrence, and Tong L. Lim It is certified that error appears in the above-identified patent and that said Letters Patent is hereby corrected as shown below:

Col. 2, line 18, "$e^{j\theta Y(\omega)}$" should read --$e^{j\theta_Y(\omega)}$--; line 34, "$e^{-j\theta Y(\omega)}$" should read --$e^{-j\theta_Y(\omega)}$--; line 44, "$e^{-j\theta Y(\omega)}$" should read --$e^{-j\theta_Y(\omega)}$--. Col. 3, line 35, "$e^{j\theta Y(\omega)}$" should read --$e^{j\theta_Y(\omega)}$--; line 43, "$e^{-j\theta Y(\omega)}$" should read --$e^{-j\theta_Y(\omega)}$--; line 47, "$e^{-j\theta Y(\omega)}$" should read --$e^{-j\theta_Y(\omega)}$--; line 62, "$\theta m$" should read --$\theta_m$--. Col. 4, line 10, "$A_{m-M}$" should read --$\tilde{A}_{m-M}$--; line 62, "$\tilde{A}_m$" should read --$\hat{A}_m$--; line 63, "$\tilde{A}_m$" should read --$\hat{A}_m$--; line 68, "$e^{-j\theta Y(\omega)}$" should read --$e^{-j\theta_Y(\omega)}$--. Col. 5, line 35, "$\tilde{A}_m$" should read --$\hat{A}_m$--; line 40, "$A_m$" should read --$\tilde{A}_m$--; line 61, "$\tilde{A}_m$" should read --$\hat{A}_m$--; line 62, "$\tilde{A}_m$" should read --$\hat{A}_m$--; line 64, "$\tilde{A}_m$" should read --$\hat{A}_m$--. Col. 6, line 3, "$\tilde{A}^*_{m-k}$" should read --$\tilde{A}^*_{m-k}$--; line 34, "$C_{-k}{}^*(m)$" should read --$C^*_{-k}(m)$--; line 40, "$C_{-k}{}^*(m)$" should read --$C^*_{-k}(m)$--; line 40, "des" should read --does--; line 51, "$\theta m$" each occurrence should read --$\theta_m$--; line 51, "$\tilde{A}_m$" should read --$\hat{A}_m$--; line 53, "$\tilde{A}_m$" should read

UNITED STATES PATENT AND TRADEMARK OFFICE
CERTIFICATE OF CORRECTION

PATENT NO. : 4,412,341  
DATED : October 25, 1983  
INVENTOR(S) : Allen Gersho, Edmond Y. Ho, Richard D. Gitlin, Victor B. Lawrence, and Tong L. Lim Page 2 of 4

It is certified that error appears in the above-identified patent and that said Letters Patent is hereby corrected as shown below:

--$\hat{A}_m$--; line 53, "θm" should read --$\theta_m$--; line 58, "$Y^*_2$" should read --$Y^*_2$--. Col. 7, line 28, "$\hat{A}_m$" should read --$\hat{A}_m$--; line 34, "$\tilde{A}_m$" should read --$\hat{A}_m$--. Col. 8, line 28, "$\tilde{A}_m$" should read --$\hat{A}_m$--; line 40, "$\tilde{A}^*_m$" should read --$\tilde{A}^*_m$--; line 42, "$Y^*_2$" should read --$Y^*_2$--; line 56, "$\tilde{A}^*_m$" should read --$\tilde{A}^*_m$--; line 58, "$\tilde{A}^*_m$" should read --$\tilde{A}^*_m$--; line 60, "$A^*_m$" should read --$A^*_m$--; line 64, "$Y^*_2$" should read --$Y^*_2$--; line 66, "$Y^*_2$" should read --$Y^*_2$--; line 68, "$Y^*_2$" should read --$Y^*_2$--. Col. 9, line 11, "$e^{-j\theta Y(\omega)}$" should read --$e^{-j\theta_Y(\omega)}$--; line 22, "$\tilde{A}_m$" each occurrence should read --$\hat{A}_m$--; line 41, "$e^{-j\theta Y(\omega)}$" each occurrence should read --$e^{-j\theta_Y(\omega)}$--; line 45, "(n≤2)" should read --(n≥2)--. Col. 10, line 1, "$e^{j\theta Y(\omega)}$" should read --$e^{j\theta_Y(\omega)}$--; line 18, "$e^{-j\theta Y(\omega)}$" should read --$e^{-j\theta_Y(\omega)}$--; line 40, "$e^{-j\theta Y(\omega)}$" should read --$e^{-j\theta_Y(\omega)}$--. Col. 11, line 10, "Y(ω-" should read --Y(ω)--; line 11, "$e^{j\theta Y(\omega)}$" should read --$e^{j\theta_Y(\omega)}$--; line 17, "Y(ω-" should read --Y(ω)--; line 18, "$e^{j\theta Y(\omega)}$" should read

UNITED STATES PATENT AND TRADEMARK OFFICE
CERTIFICATE OF CORRECTION

PATENT NO. : 4,412,341
DATED : October 25, 1983
INVENTOR(S) : Allen Gersho, Edmond Y. Ho, Richard D. Gitlin, Victor B. Lawrence, and Tong L. Lim It is certified that error appears in the above-identified patent and that said Letters Patent is hereby corrected as shown below:

$--e^{j\theta}{}_Y(\omega)--$; line 63, "$e^{j\theta Y(\omega)}$" should read $--e^{j\theta}{}_Y(\omega)--$. Col. 12, line 2, "$e^{j\theta Y(\omega)}$" should read $--e^{j\theta}{}_Y(\omega)--$; line 34, "θm" should read $--\theta_m--$; line 45, "$\tilde{A}_m$" should read $--\hat{A}_m--$; line 58, "$Y^*{}_2$" should read $--Y^*_2--$; line 67, "$\tilde{A}_m$" should read $--\hat{A}_m--$; line 67, "θm" should read $--\theta_m--$. Col. 13, line 11, "$\tilde{A}^*{}_m$" should read $--\tilde{A}^*_m--$; line 20, "$\tilde{A}_m$" should read $--\hat{A}_m--$; line 25, "$e^{j\theta Y(\omega)}$" should read $--e^{j\theta}{}_Y(\omega)--$; line 43, "$e^{-j\theta Y(\omega)}$" should read $--e^{-j\theta}{}_Y(\omega)--$; line 52, "claim 32" should read --claim 31--. Col. 14, line 5, "Y(ω-" should read --Y(ω)--; line 6, "$e^{j\theta Y(\omega)}$" should read $--e^{j\theta}{}_Y(\omega)--$; line 11, "Y(ω-" should read --Y(ω)--; line 12, "$e^{j\theta Y(\omega)}$" should read $--e^{j\theta}{}_Y(\omega)--$; line 45, "$e^{j\theta Y(\omega)}$" should read $--e^{j\theta}{}_Y(\omega)--$; line 51, "$e^{j\theta Y(\omega)}$" should read $--e^{j\theta}{}_Y(\omega)--$. Col. 15, line 7, "θm" should read $--\theta_m--$; line 19, "$\tilde{A}_m$" should read $--\hat{A}_m--$. Col. 16, line 1, "$Y^*{}_2$" should read $--Y^*_2--$; line 11, "$\tilde{A}_m$" should read $--\hat{A}_m--$;

UNITED STATES PATENT AND TRADEMARK OFFICE
CERTIFICATE OF CORRECTION

PATENT NO. : 4,412,341

DATED : October 25, 1983

INVENTOR(S) : Allen Gersho, Edmond Y. Ho, Richard D. Gitlin, Victor B. Lawrence, and Tong L. Lim It is certified that error appears in the above-identified patent and that said Letters Patent is hereby corrected as shown below:

line 11, "θm" should read --$\theta_m$--; line 22, "$\tilde{A}^*_m$" should read --$\tilde{A}^*_m$--; line 28, "$A_m$" should read --$\hat{A}_m$--.

Column 11, line 11, delete -- ) -- Column 14, line 6, delete -- ) --. Column 14, line 12, delete -- ) --.

Signed and Sealed this

Eighteenth Day of December 1984

[SEAL]

Attest:

GERALD J. MOSSINGHOFF

Attesting Officer

Commissioner of Patents and Trademarks